United States Patent Office 2,751,437
Patented June 19, 1956

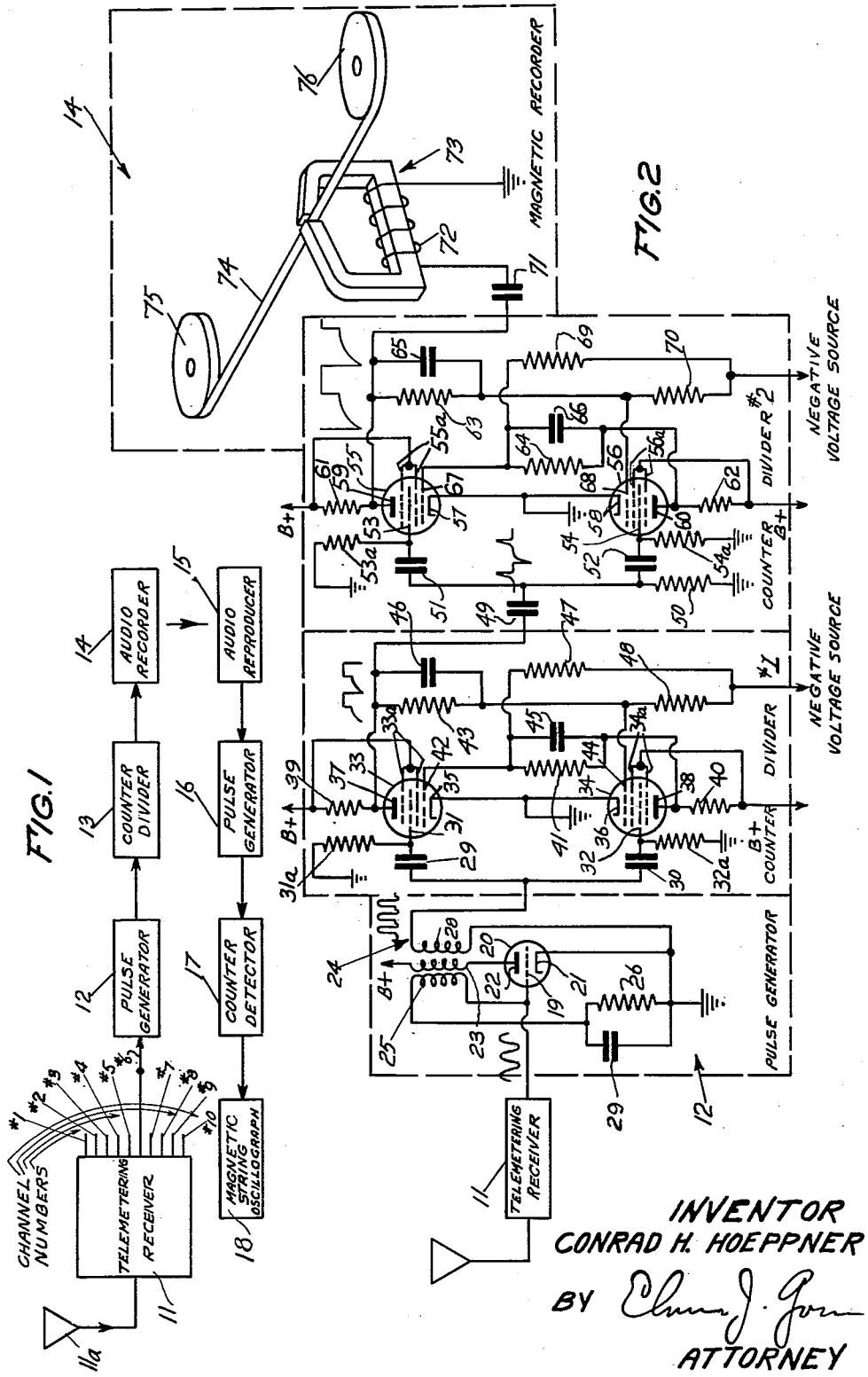

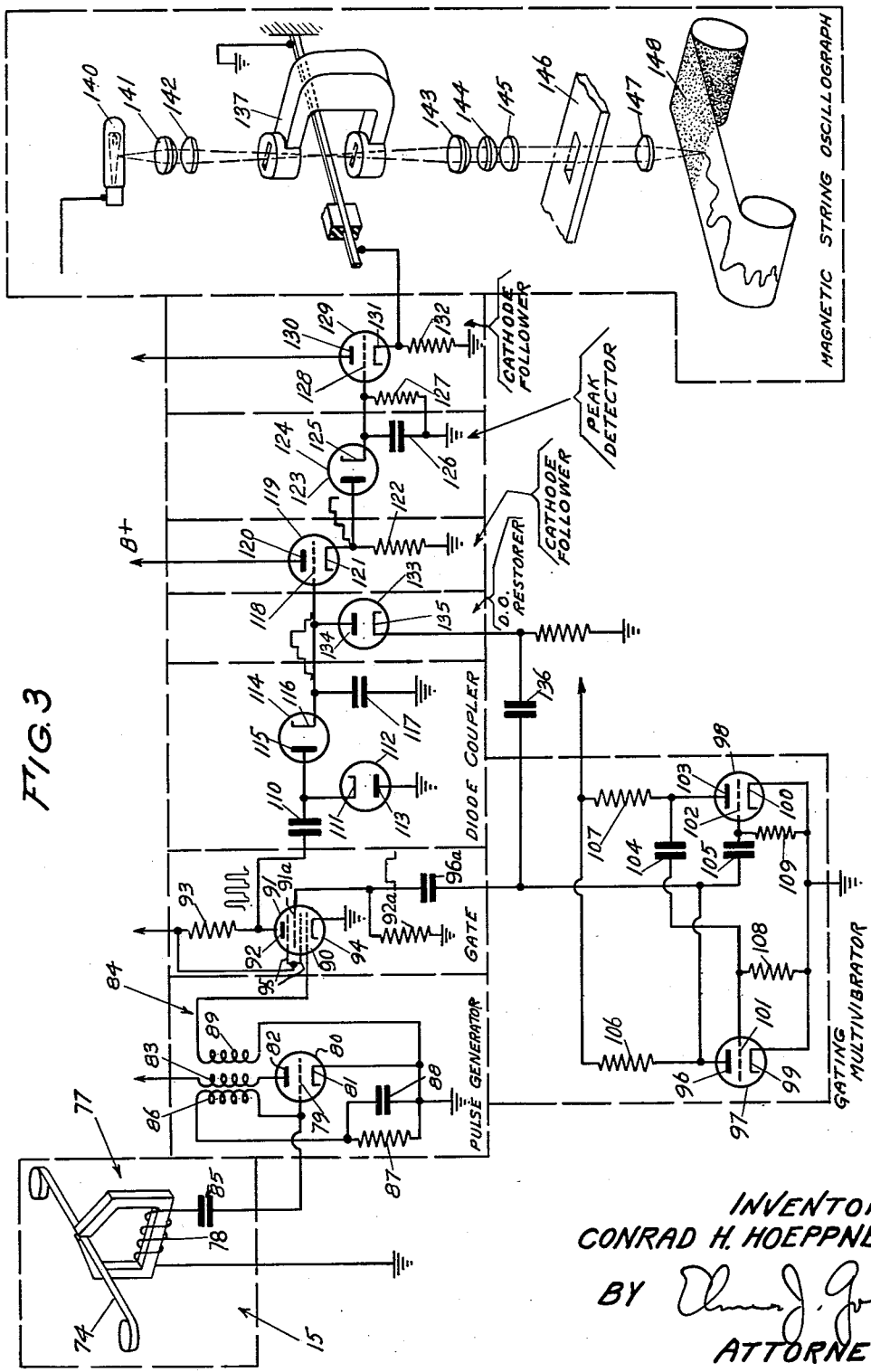

2,751,437
SIGNAL TRANSLATION SYSTEMS

Conrad H. Hoeppner, Waltham, Mass., assignor to Raytheon Manufacturing Company, Newton, Mass., a corporation of Delaware Application October 19, 1950, Serial No. 190,995

3 Claims. (Cl. 179—100.2)

This invention relates to a system for proportionally changing frequencies of an intelligence-modulated signal to different frequencies. In particular, this invention discloses a system whereby a frequency-varying signal may be divided one or more times such that frequencies of the resulting signal bear a proportional relationship to the original signal.

In telemetering systems, information is sent, for example, from an information source, such as a moving body, to a measuring station where the information may be recorded and utilized. Recording apparatus at present available, such as, for example, magnetic recording tapes, have an upper frequency limit of fifteen to twenty kilocycles. Hence, information at frequencies above fifteen or twenty kilocycles cannot be recorded by these means.

In many telemetering applications where a number of channels are positioned one above the other in the sonic and supersonic frequency spectrum, said channels being all modulated onto the same carrier, the intelligence signals in the upper channels commonly may have carrier frequencies lying in the range as high as sixty to seventy kilocycles, and even one hundred kilocycles. For example, if there were ten channels in the telemetering system, the first channel might utilize frequencies from zero to five kilocycles, the second channel from ten to fifteen kilocycles, the third channel from twenty to twenty-five kilocycles, and so on, with the tenth band occupying the range from 90 to 95 kilocycles. The intermediate frequency bands between the channels, for example, five kilocycles to ten kilocycles and fifteen kilocycles to twenty kilocycles, and so on, are normally left blank in order to allow sufficient spacing between the channels to prevent cross-modulation therebetween.

Thus, for example, number 10 channel might carry information indicative of the temperature of the body from which the signals originated with, for example, ninety-five kilocycles being the upper temperature limit and ninety kilocycles the lower temperature limit with the various frequencies corresponding to various temperatures in between these temperature limits.

Since it is desirable in the interest of economy to record information from all the telemetering channels simultaneously on the same magnetic medium, it has been found desirable to shift all the frequencies down into the audio group which may be recorded on the magnetic madium. Conventional methods of frequency reduction, such as the beating of intelligence frequency against a separate oscillator frequency and detecting the difference therebetween, are unsatisfactory since several intelligence signals would then be superimposed within the same audio band.

This invention discloses apparatus for dividing the frequencies of all the bands proportionally so that all the bands will fall within the recordable audio-frequency spectrum. Briefly, this may be accomplished in the following manner. A source of signals of one frequency range, for example, ninety-five kilocycles, is used to trigger a pulse-forming circuit, such as a pulse generator, so that for every cycle of this frequency a rectangular output pulse is produced from the pulse generator. The rectangular pulses are then fed through a counter-divider circuit, such as a bistable-multivibrator circuit, which produces a single pulse output for every two pulses input. Several of these counter-divider circuits may be placed, if desired, in cascade to divide the frequency several times until the input frequency is down within the audio range, whereupon it is recorded on the magnetic medium.

When it is desired to utilize the information stored in the magnetic medium, information may be picked off the medium by a reproducing signal head, the output of which is again used to control a pulse-forming circuit. The rectangular outputs from the pulse-forming circuit are then fed to a counting detector which produces an amplitude output corresponding to the frequency of the signal input. This output may be then used to plot graphs and perform other engineering functions.

This system is particularly useful where the initial recording must be made at a point remote from the place of utilization of information such as, for example, at a remote pick-up station. The recording medium is then brought to a central calculation and recording center where it is reproduced from the recording medium and utilized for calculating and plotting. By dividing the frequency down, much information, for example, the information from ten channels, may be recorded on a signal magnetic medium, thereby providing a concise and compact record of the telemetered information. Furthermore, since the information from all channels is recorded simultaneously, the relative time of recording of the information from the various channels is known.

Other and further advantages of this invention will be apparent as the description thereof progresses, reference being had to the accompanying drawings, wherein:

Fig. 1 illustrates a functional flow diagram of an electronic system utilizing this invention;

Fig. 2 illustrates a schematic diagram of the frequency dividing and recording system shown in Fig. 1; and Fig. 3 illustrates a schematic diagram of the reproducing system shown in Fig. 1.

Referring now to Fig. 1, there is shown an antenna 11a which feeds signals, received from a telemetering transmitter, to a telemetering receiver 11. Telemetering receiver 11 may be, for example, a frequency-modulation receiver, the output of which is a plurality of subcarrier frequencies ranging all the way from zero up to, for example, eighty kilocycles. Each channel is separated and a representative channel is taken here by way of example, the output of this channel being fed to a pulse generator 12. If this channel is, for example, channel number 6 in the range of from sixty to sixty-five kilocycles, the pulse generator 12 will be triggered sixty to sixty-five thousand times per second dependent on the input frequency. The output of the pulse generator 12 is fed through a counter divider 13 which may be, for example, one or more bistable multivibrators, one form of which will be described presently.

The output of counter divider 13, which may be, for example, several bistable multivibrators in cascade, will be a train of pulses having a frequency which is a proportional part of the input frequency; for example, if two bistable multivibrators are employed in the counter divider 13, the output thereof will have a frequency one-fourth as great as the input frequency. This output-pulse train comprises substantially rectangular pulses, and is fed to an audio recorder 14 which may be, for example, a magnetic tape. Each of the other output channels from the telemetering receiver 11 is fed through a separate frequency-dividing system similar to units 12 and 13, and the outputs of these systems may then be recorded simultaneously on audio recorder 14.

When recording of the telemetered information is completed, the audio recorder 14 is brought to a central operations station to have the information thereof reproduced and utilized. The magnetic tape on the audio recorder 14 is placed in an audio reproducer 15 to accomplish this purpose. The particular output frequency of reproducer 15, which corresponds to channel 6 will have a frequency approximately one-fourth the input frequency of channel 6 from telemetering receiver 11 or from fifteen thousand to sixteen thousand two hundred and fifty cycles. This output is fed to a pulse generator 16 which produces rectangular-pulse trains of the same frequency as the output of reproducer 15. By appropriate choice of its circuit parameters, pulse generator 16 may be made to trigger only in response to frequencies from reproducer 15, which correspond to channel 6, or any other desired channel. If desired, a band-pass filter responsive to frequencies of the desired channel may be inserted between reproducer 15 and pulse generator 16. Pulse generator 16 feeds a counter detector 17 which produces an amplitude-varying signal proportional to the frequency variation of the output from pulse generator 16. For the purposes of definition, the term "counter detector" as used throughout the specification and claims means any device which will produce an output signal whose amplitude varies as a function of the frequency variation of the input signal. The output of counter detector 17 is fed to any desired utilization means, such as the magnetic-string oscillograph 18 used for plotting information on photographic or sensitized paper to produce a graph of the telemetered information.

Referring now to Fig. 2, there is shown circuit details of the elements 11 through 14 of Fig. 1. The output of a particular channel of the telemetering receiver 11 is connected to the grid 19 of a pulse-generator triode 20. The cathode 21 of triode 20 is grounded, and the plate 22 thereof is connected through the primary winding 23 of a pulse transformer 24 to B+. The grid 19 of triode 20 is connected through a secondary coil 25 of pulse transformer 24 and a grid-leak resistance 26 to ground. Grid-leak resistance 26 is by-passed by a condenser 27. An output winding 28 of transformer 24, across which the pulse appears, is connected between ground and the junction of two condensers 29 and 30, respectively. Condensers 29 and 30 are connected, respectively, to the signal-injection grids 31 and 32 of pentagrid tubes 33 and 34 of a counter divider, for example, as shown here, a bistable multivibrator circuit. The cathodes 35 and 36 of tubes 33 and 34 are grounded, and the plates 37 and 38 thereof are connected to B+ through load resistors 39 and 40, respectively. Injection grids 31 and 32 are connected to ground through signal-load resistors 31a and 32a, respectively. Screen grids 33a and 34a of tubes 33 and 34, respectively, are connected to B+. Plate 38 is also connected through a resistor 41 to the grid 42 of tube 33, while plate 37 is connected through a resistor 43 to the grid 44 of tube 34. Resistors 41 and 43 are by-passed by condensers 45 and 46, respectively, and grids 42 and 44 are connected to a negative potential bias source through grid-load resistors 47 and 48, respectively.

Plate 37 is also connected through a coupling condenser 49 and a resistor 50, in series therewith, to ground. The junction between condenser 49 and resistor 50 produces a signal which corresponds to the differentiation of the output pulses produced at plate 37. The junction between condenser 49 and resistor 50 is connected through condensers 51 and 52 to the signal-injection grids 53 and 54, respectively, of pentagrid tubes 55 and 56, respectively, which constitute a second counter-divider stage similar to the counter-divider stage just described. The cathodes 57 and 58 of tubes 55 and 56 are grounded, and the plates 59 and 60 thereof are connected through load resistors 61 and 62, respectively, to B+.

The plates are also connected, respectively, to the control grids 67 and 68 of the opposite tubes through resistors 63 and 64, respectively, which are by-passed by condensers 65 and 66, respectively. Grids 67 and 68 of tubes 55 and 56 are connected to a negative potential bias source through grid-load resistors 69 and 70, respectively. Injection grids 53 and 54 are connected to ground through load resistors 53a and 54a, respectively. Screen grids 55a and 56a of tubes 55 and 56, respectively, are connected to B+.

Plate 59 is also connected through a condenser 71 and the magnet coil 72 of an electromagnetic recording head 73 to ground. Electromagnetic recording head 73 comprises an electromagnet having closely positioned pole pieces through which a magnetizable medium 74 passes from a feeding reel 75 to a winding reel 76 in a well-known manner. Signals from the other output channels of the telemetering receiver may be reduced in frequency and fed to magnetic recording head 73 simultaneously with the output of the channel illustrated in Fig. 2. The result is that the signals from the telemetering receiver 11 are divided and then recorded on the magnetic medium 74.

In operation, the output of a particular channel of the telemetering receiver 11 will be a sinusoidal wave form which varies in frequency. This sinusoidal wave form drives the grid 19 of the pulse generator, which is normally cut off, positive, causing the tube 20 to conduct. The current through the transformer 24 produces a regenerative voltage on grid 19 driving grid 19 partially positive until grid current is drawn, thereby charging condenser 29. At this time, since the current through the transformer primary 23 levels off, the secondary voltages drop to zero, thus driving grid 19 negative, producing a decrease in the current through the primary 23 and driving the grid 19 into cutoff where it is maintained by the charge on condenser 29 until the next positive excursion of the sine wave. The result is a train of substantially rectangular pulse outputs from the pulse generator, one pulse for every cycle of the sinusoidal input. These pulses are fed through condensers 29 and 30 to the injection grids of tubes 33 and 34, respectively. The circuit is a form of bistable multivibrator wherein, when one tube is conducting heavily, the other tube is substantially cut-off. Positive pulses fed to the injection grids of these tubes will not affect the tube conducting heavily, but will drive the normally cut-off tube into the conductive region.

Since the control grid of the opposite tube is coupled to the plate of the tube being driven into conduction, the grid of the opposite tube is driven negative into cut-off. The grid, which is driven into cutoff, then gradually returns toward the cutoff point, as the condenser connecting this grid to the plate of the opposite tube discharges through the shunting resistor, until a point is reached where the system may be triggered by another positive pulse to cause a reversal of the action with the normally conducting tube being cut off, and the cut-off tube becoming normally conductive. The result is that an output from the plate of one of the tubes is a substantially rectangular wave form whose repetition rate is half the input pulse repetition rate. Passage of this wave form through a differentiating circuit comprising condenser 49 and resistor 50 produces a positive pip at the leading edge of the wave form followed by a negative pip at the trailing edge of the wave form. Since only the positive pips are effective in triggering the succeeding counter divider which is similar to the counter divider just described, it may be seen that for every two pulses input in the first counter divider a single effective pulse is obtained from the output thereof, thus effectively dividing the number of pulses by a factor of two. The output wave form of the second counter divider is recorded directly in the magnetic tape which, due to its lack of response of upper frequencies, tends to record the rectangular wave form as a substantially sinusoidal wave form of a frequency equal to the repetition rate of the rectangular pulses. Obviously, if it is desired to reduce the frequency still further, other counter dividers may be added to the two already shown.

Referring now to Fig. 3, there is shown a system for reproducing the information recorded on the magnetic medium 74. To accomplish this, the magnetic medium 74 is placed in a reproducing device 15 which has a magnetic reproducing head 77 similar to the recording head 73 of the recorder 14. A coil 78 is wound about the magnet of the head 77, and, as the tape 74 passes between the poles of the magnet, voltages are induced in coil 78. One end of coil 78 is grounded, and the other end thereof is connected to the grid 79 of a pulse-generator tube 80 through a coupling condenser 85.

The pulse generator embodying tube 80 is, as shown here, similar to the pulse generator 12. The cathode 81 of tube 80 is grounded. The plate 82 is connected through the primary winding 83 of a transformer 84 to B+. A secondary winding 86 of transformer 84 has one end thereof connected to the grid 79, and the other end thereof connected to ground through a resistor 87 bypassed by a condenser 88. Another secondary winding 89 of transformer 84 is connected from ground to the control grid 90 of a gating tube 91, shown here as a pentagrid tube. The plate 92 of gating tube 91 is connected to B+ through a plate-load resistor 93. The cathode 94 thereof is grounded. The screen grids 95 of tube 91 are connected to B+. The signal injection grid 91a is connected through a coupling condenser 96a to the plate 96 of a tube 97 which, in conjunction with another tube 98, forms a free-running gating multivibrator. Injection grid 91a is also connected to ground through a resistor 92a. The gating multivibrator may be of any desired type.

As shown here, for example, the cathodes 99 and 100 of tubes 97 and 98 are grounded. The grids 101 and 102 of tubes 97 and 98 are connected to the plates 103 and 96 of the opposite tubes through condensers 104 and 105, respectively. The plates 96 and 103 are connected to B+ through plate-load resistors 106 and 107, respectively. The grid 101 is connected to ground through a grid-load resistor 108, while the grid 102 is connected to ground through a grid-load resistor 109.

The plate 92 of gate tube 91 is connected through a condenser 110 to the cathode 111 of a diode 112, the plate 113 thereof being grounded. Diode 112 constitutes one-half of a diode-cupling circuit. The other half of the circuit includes a second diode 114, the plate 115 of which is connected to the cathode 111 of diode 112, and the cathode 116 of diode 114 is connected to ground through a condenser 117.

Cathode 116 is also connected to the grid 118 of a cathode follower tube 119. The plate 120 of tube 119 is connected to B+, while the cathode 121 thereof is connected to ground through a load resistor 122. Cathode 121 of the cathode follower 119 is also connected to the plate 123 of a diode 124, the cathode 125 of which is connected to ground through a condenser 126. Condenser 126 is by-passed by a load resistor 127.

The cathode 125 is connected to the grid 128 of a cathode follower 129, plate 130 of which is connected to B+, and a cathode 131 of which is connected to ground through a cathode-load resistor 132. The grid 118 of cathode follower 119 is also connected to a restoring circuit comprising a diode 133. Specifically, the grid 118 is connected to the plate 134 of diode 133. The cathode 135 of diode 133 is connected through a condenser 136 to the plate 96 of the tube 97 of the gating multivibrator. The overall circuit functions as a counter-detector circuit which produces a varying D. C. voltage output proportional to the number of input pulses per second.

In operation, a rectangular pulse output from the free-running gating generator comprising tubes 97 and 98 opens the gate comprising tube 91 for a predetermined time, and allows a number of pulses from the pulse generator 80 to pass therethrough. The number of pulses which pass through gate 91 in a predetermined time will depend on the repetition rate or the frequency of pulses produced by pulse generator 80. The number of pulses passing through the gate 91 are then converted into a proportional amplitude voltage in the following manner. A pulse applied through condenser 110 will drive the plate 115 of diode 114 positive, thus effectively connecting the condenser 117, in series, with the condenser 110. This makes a condenser voltage divider. If the condenser 117 is much larger than the condenser 110, for example, ten times larger, one-tenth of the voltage will appear across the condenser 117, and the remainder will appear across condenser 110.

When the rectangular pulse has passed the plate 115 of the diode 114, diode 114 is driven more negative than its cathode 116 which is connected to condenser 117 and, therefore, no longer conducts, the cathode 111 of tube 112, however, now being negative with respect to ground conductors, thus returning the junction between cathode 111, condenser 110 and plate 115 to ground potential. The next pulse is again divided across condensers 110 and 117 raising the total potential across condenser 117 by an additional substantially equal amount. This process continues for every additional pulse, and thus it may be seen that the charge on condenser 117 increases substantially proportionally with the number of pulses which are passed by gate 91.

At the end of the gating period, the cathode 135 is driven negative by the trailing edge of the gating pulse, thus returning the potential of cathode 116 to ground. The result is a step-charging wave form whose peak is proportional to the number of pulses passed by the gate. The output of the cathode follower is fed through a peak detector comprising the diode 124 and condenser 126, the time constant of resistor 127 and condenser 126 being substantially greater than the time between peaks of the step-charging wave form with the result that the output of the peak detector is a varying D. C. voltage proportional to the peaks of the step-charging wave form produced by the diode-counting circuit.

The output of cathode follower 129, which is the varying D. C. voltage produced by peak detector comprising diode 124, may be utilized for any desired purpose, such as instantaneous computation, or, as is shown here by way of example, for recording the information on photographic sensitized paper.

One form of recorder, shown here by way of example, is a magnetic-string oscillograph of the Einthoven type. This form of a magnetic-string oscillograph, as shown here, comprises a horseshoe magnet 137 having poles with slots therethrough to allow a beam of light to pass through both slots. Positioned between the poles of the magnet is a piece of wire which is mounted with sufficient resiliency such that it will move in the magnetic field produced by the magnet 137 in response to the passage of a current therethrough. One end of wire is connected to the cathode 131, and the other end thereof is connected through a suitable resilient support to ground. Light from a source, for example, lamp 140, may be passed through suitable focusing lenses 141 and 142 and through the slots in the pole of magnet 137 to impinge on wire, then passing on through other focusing lenses 143, 144 and 145 and through an iris 146 and a focusing lens 147 to impinge on a roll of photographic or sensitized paper 148 which moves slowly past the point of impingement of the light beam thereon. The result is a shadow cast by the wire on paper which varies in position according to the current through the wire, thus producing a graph on the paper 148. The remainder of the paper area is exposed to light as it passes the iris 146, while the portion on which the wire shadow fell is not exposed to light.

This completes the description of the embodiment of the invention illustrated herein. However, many modifications thereof will be apparent to persons skilled in the art without departing from the spirit and scope of this invention. For example, additional frequency filtering could be used throughout the system, if desired. Many different types of detection devices could be used, for example, a standard frequency discriminator in detecting the output of the recorded medium, and many different utilization circuits and devices could be used in conjunction with this system. Therefore, it is desired that this invention be not limited to the particular details described herein, except as defined by the appended claims.

What is claimed is:

1. A communication system comprising a source of a plurality of frequency signals, the frequencies of said signals representing the intelligence being communicated, recording means for recording said intelligence, said frequencies including a frequency outside the range of response of said recording means, a pulse generator for converting each cycle of each frequency signal into a pulse, means for proportionally reducing the frequencies of said pulses in accordance with a fixed proportional factor whereby all of the reduced frequency pulses are brought within the range of response of said recording means, means for supplying said reduced frequency pulses to said recording means, and reproduction means for producing a usable signal from said recording means.

2. A communication system comprising a source of a plurality of frequency signals, the frequencies of said signals representing the intelligence being communicated, recording means for recording said intelligence, said frequencies including a frequency outside the range of response of said recording means, a pulse generator for converting each cycle of each frequency signal into a pulse, a divider unit for detecting every second pulse, a plurality of said divider units being connected in cascade, the number of divider units connected in cascade bearing a direct relation to the frequency of the original source signals in order to reduce the frequency pulses to within the range of response of said recording means, means for supplying said reduced frequency pulses to said recording means, and reproduction means for producing a usable signal from said recorded pulses.

3. A communication system comprising a source of a plurality of frequency signals, the frequencies of said signals representing the intelligence being communicated, recording means for recording said intelligence, said frequencies including a frequency outside the range of response of said recording means, a pulse generator for converting each cycle of each frequency signal into a pulse, a divider unit for detecting every second pulse, a plurality of said divider units being connected in cascade, the number of divider units connected in cascade bearing a direct relation to the frequency of the original source signals in order to reduce the frequency pulses to within the range of response of said recording means, means for supplying said reduced frequency pulses to said recording means, and reproduction means for producing from said recorded pulses a usable signal having a direct relationship to the frequency of the original source signals.

References Cited in the file of this patent

UNITED STATES PATENTS

| | | |
|---|---|---|
| 1,794,664 | Balsley | Mar. 3, 1931 |
| 1,957,885 | Grimwood | May 8, 1934 |
| 2,352,023 | Schuller | June 20, 1944 |
| 2,381,920 | Miller | Aug. 14, 1945 |
| 2,405,597 | Miller | Aug. 13, 1946 |
| 2,421,727 | Thompson | June 3, 1947 |
| 2,426,778 | Long | Sept. 2, 1947 |
| 2,435,879 | Eilenberger | Feb. 10, 1948 |
| 2,476,162 | Thompson | July 12, 1949 |
| 2,511,204 | Goldstine | June 13, 1950 |
| 2,603,418 | Ferguson | July 15, 1952 |